United States Patent
Sarpangal

(12) 
(10) Patent No.: US 6,529,970 B1
(45) Date of Patent: Mar. 4, 2003

(54) METHOD AND MICROPROCESSOR WITH FAST PROGRAM DOWNLOADING FEATURES

(75) Inventor: Sudarshan Sarpangal, Cupertino, CA (US)

(73) Assignee: Fujitsu Microelectronics America, Inc., San Jose, CA (US)

( * ) Notice: Subject to any disclaimer, the term of this patent is extended or adjusted under 35 U.S.C. 154(b) by 0 days.

(21) Appl. No.: 09/549,327

(22) Filed: Apr. 13, 2000

(51) Int. Cl.⁷ .................... G06F 13/14; G06F 13/20
(52) U.S. Cl. .............. 710/33; 710/35; 710/58; 710/60; 710/61
(58) Field of Search ............... 710/33, 35, 58, 710/60, 61

(56) References Cited

U.S. PATENT DOCUMENTS

| | | | |
|---|---|---|---|
| 4,782,439 A | 11/1988 | Borkar et al. ............... 364/200 |
| 5,068,785 A * | 11/1991 | Sugiyama ................... 710/105 |
| 5,455,920 A | 10/1995 | Muramatsu ............ 395/200.08 |
| 5,588,132 A | 12/1996 | Cardoza ..................... 395/475 |
| 5,596,738 A | 1/1997 | Pope .......................... 395/430 |
| 5,673,157 A * | 9/1997 | Ycas et al. ................ 360/97.01 |
| 5,694,067 A | 12/1997 | Hull et al. ................... 327/143 |
| 5,748,981 A | 5/1998 | Patchen et al. ............. 395/828 |
| 5,758,134 A | 5/1998 | Imel et al. .................. 395/556 |
| 5,764,907 A | 6/1998 | Hurley et al. .......... 395/200.46 |
| 5,936,632 A * | 8/1999 | Cunniff et al. .............. 345/582 |
| 5,968,153 A * | 10/1999 | Wheeler et al. ............ 710/110 |
| 6,011,537 A * | 1/2000 | Slotznick .................... 345/700 |
| 6,272,534 B1 * | 8/2001 | Guha ......................... 709/216 |

* cited by examiner

*Primary Examiner*—Jeffrey Gaffin
*Assistant Examiner*—Rehana Perveen
(74) *Attorney, Agent, or Firm*—Christie, Parker & Hale, LLP

(57) ABSTRACT

A method and system of fast program downloading to a target system that includes a printed circuit board. A processor is on the printed circuit board and a target interface having electrical contact pads is embedded on the printed circuit board. The processor includes information signals coupled to the electrical contact pads. The dispatcher includes a dispatcher interface coupled to the target system via the target interface, such that dispatcher interface is coupled to the information signals of the processor.

36 Claims, 8 Drawing Sheets

METHOD AND MICROPROCESSOR WITH FAST PROGRAM DOWNLOADING FEATURES

BACKGROUND OF THE INVENTION

The present invention relates generally to systems and methods for downloading program information, and in particular to methods and systems for downloading program information into an embedded system.

Embedded systems are used in a multitude of applications ranging from simple consumer-electronic devices to sophisticated computing devices. Embedded systems offer a high density and low cost solution to many technical needs. Often embedded systems include microprocessors that require program information to operate. In some applications, the program information is data containing operating parameters and/or constants. In other applications, the program information is instructions used by the microprocessor to respond in a predefined fashion when exposed to a predetermined stimulus. In some applications, the program information is the predetermined stimulus. In all applications, the program information is usually large and thus downloading of the program information is often slow. Furthermore, program information is often prone to updates or modifications. As a result, downloading of the program information to the embedded system is often repetitive and time consuming.

In one particular application, testing embedded systems, specifically devices on a printed circuit, such as a microprocessor, is often difficult and time consuming. Particularly, the downloading of multiple iterations of program information is often required and attributes to a large portion of the time and cost in testing embedded systems.

In most applications, the program information is transmitted or downloaded to the embedded system through a communication medium, usually parallel or serial cables, and a corresponding interface connector. Downloading the program information utilizing serial cables is slower than downloading the program information utilizing parallel cables. However, downloading the program information utilizing parallel cables requires a larger foot print or layout space on the embedded system then utilizing serial cables. Specifically, embedded systems utilizing parallel cables require more pins or connector points on the corresponding interface connector than embedded systems utilizing serial cables. Furthermore, often, the corresponding interface connector is not needed or utilized by the embedded system other than for providing a connection for the downloading of the program information. As a result, the corresponding connector often becomes wasted space after downloading of the "final" program information to the embedded system is accomplished. Hence, cost is increased to add pins to support the corresponding interface connector and to subsequently remove the pins added.

Additionally, on-board logic components or gates may need to be added to the embedded system to support the downloading of the program software. The on-board logic components, however, require additional layout space and increase the cost of the embedded system. Therefore, a system and method of providing program information quickly and dynamically without requiring a significant amount of layout space is desirable.

SUMMARY OF THE INVENTION

The present invention provides methods and systems of downloading program information quickly and includes minimal board layout requirements. The present invention provides a method of downloading program information to a target system using a fast program download system. The target system includes a processor on a printed circuit board. The method comprises providing program information to a dispatcher, notifying the target system that the program information is ready to be transferred, notifying the dispatcher to transfer the program information into the target system, transferring the program information to the target system from the dispatcher via a direct connection, the direct connection includes contact pads embedded in the printed circuit board of the target system.

In one embodiment, the method comprises receiving a first handshake signal by the processor of the target system to signify that program information is ready to be transferred, transmitting a second handshake signal from the processor of the target system upon receipt of receiving the first handshake signal, transferring the program information to the target system via a direct connection, the direct connection includes contact pads embedded in the printed circuit board of the target system and coupled to the processor, and transmitting a third handshake signal from the processor of the target system to initiate the transferring of the program information.

In another embodiment, the present invention provides a fast download program system to download program information. The fast download program system comprises a target system and a dispatcher. The target system includes a printed circuit board, a processor on the printed circuit board and a target interface having electrical contact pads embedded on the printed circuit board and the processor having information signals coupled to the electrical contact pads. The dispatcher includes a dispatcher interface coupled to the target system via the target interface, such that dispatcher interface is coupled to the information signals of the processor.

In another embodiment, the fast download program system comprises a target system that includes a printed circuit board, a processor on the printed circuit board having additional pins, a target interface having electrical contact pads embedded on the printed circuit board and the processor having additional pins to receive and supply information signals coupled to the electrical contact pads, wherein the information signals are handshake signals to coordinate downloading of the program information.

Many of the attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

I. Overview

Figure 1:
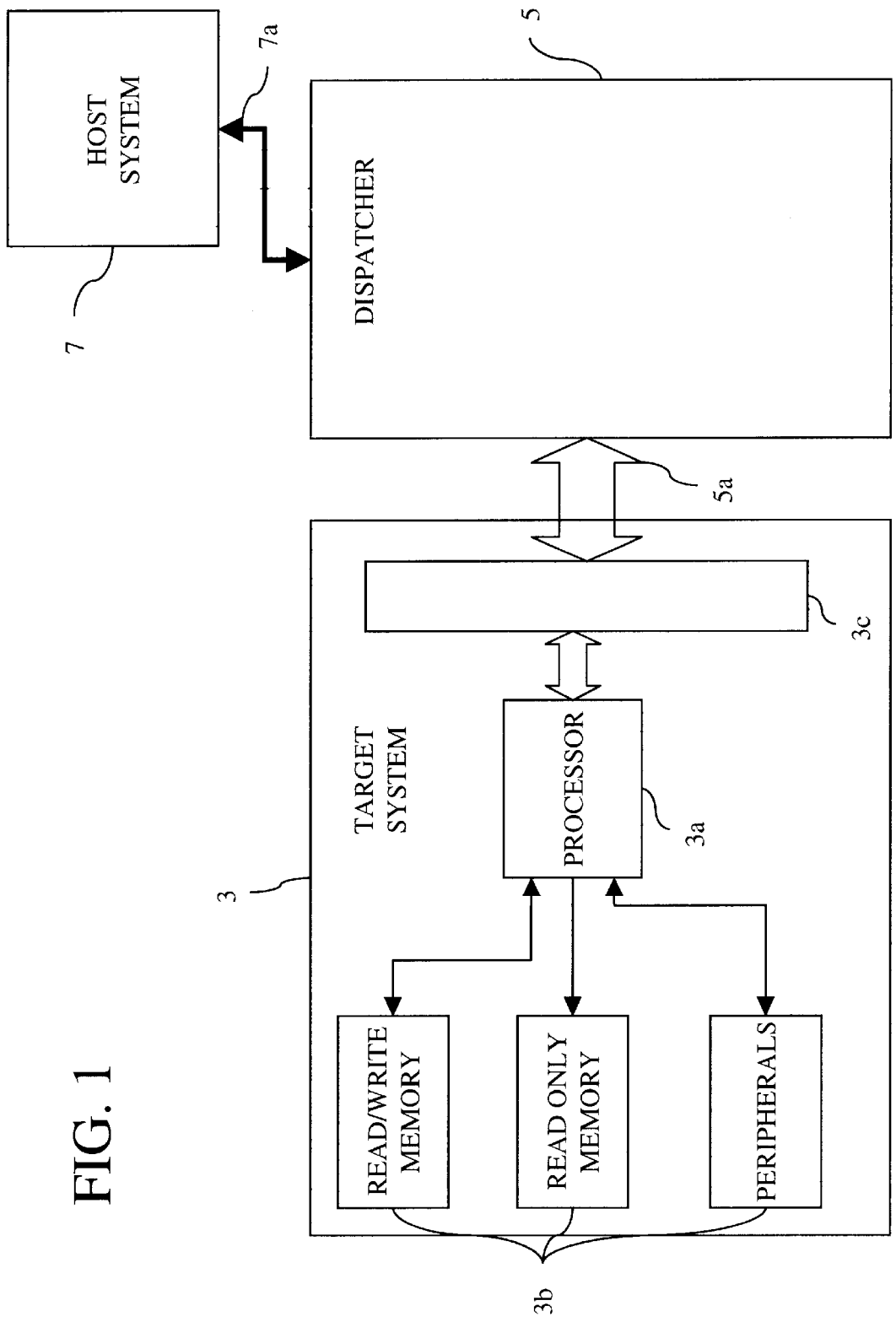
FIG. 1 illustrates a block diagram of the fast download program system of the present invention.

FIG. 1 illustrates a block diagram of a fast download program system of the present invention. The fast download program system includes a target system 3, a dispatcher 5 and a host system 7. The target system 3 includes devices or components. In one embodiment, the target system 3 includes devices or components that are being tested. In other words, the target system includes devices that are operated under specific predetermined conditions in which expected and actual results or functions are observed and compared. Specifically, the target system 3 includes a processor 3a and other components 3b, such as read/write memory, read only memory and peripherals. The processor 3a performs a predetermined set of functions and manages the operation of the other components 3b. In particular, the processor executes software programs, e.g., program information, that determines the set of functions performed by the processor including the sequence of the functions' execution.

The target system, in one embodiment, also includes a printed circuit board. The processor and other components are located on the printed circuit board. The printed circuit board provides a network of electrical traces and contacts interconnecting the processor and the other components. The printed circuit board also provides connectivity of the processor and the other components to electrical contact pads which provides a pathway to transfer data in and out of the target system. For instance, in the embodiment described, the target system 3 includes a target connector interface 3c. The target connector interface 3c is a set of contact pads on the printed circuit board of the target system. The set of contact pads are coupled to processor 3a. The dispatcher 5 is coupled to the contact pads by using a dispatcher connector interface 5a, such as a "bed-of-nails" connector or a "pogo" type pin connector.

In one embodiment, the target connector interface 3c is a "low cost" header connector including a "low cost" ribbon cable. The header connector establishes a direct electrical connection between the contact pads of the printed circuit board and corresponding vertical pins. The ribbon cable contains corresponding receptacles that receive the vertical pins and provide a conduit to the dispatcher. Thus, in this embodiment, the dispatcher is coupled to the target system through a ribbon cable. Therefore, using the header connector or the contact pads on the printed circuit board, the cost and layout space for a parallel or serial connector is eliminated. Furthermore, the download speed or transferring the program information from one system to another system is not reduced. In fact, transfer speed using the contact pads and the dispatcher connector interface 5a or the simple header connector with the ribbon cable is significantly faster than conventional serial type connections.

In one embodiment, the host system 7 is a computer configured to modify and create program information. In one embodiment, the host system 7 is a particular production station configured to store different iterations or types of program information. In another embodiment, the host system 7 is a particular test station configured to modify and create program information. The program information, in this embodiment, is a test program used to exercise particular functions of the target system 3. Once the program information is created or updated, the host system 7 transfers the program information to the dispatcher 5, through a communication medium 7a. In one embodiment, the communication medium 7a is a bi-directional communication interface, such as a parallel or serial connection. In another embodiment, the communication medium is a network interface, such as an Ethernet or a fiber optic connection.

The dispatcher 5 communicates with the target system 3 to determine if the target system is ready to receive the program information. Alternatively, the target system notifies the dispatcher 5 requesting the dispatcher to transfer the program information. In other words, the target system and the dispatcher utilize hardware and software flow control schemes, e.g., a series of handshake signals, to efficiently coordinate the transfer of the program information from the dispatcher to the target system. Once the target system 3 receives the program information, the processor 3a executes the program information. In one embodiment, program information includes data, such as parameters or other operating values that is transferred to the target system. In another embodiment, program information includes application code used to program or configure the processor to execute instructions in a predefined manner that is transferred to the target system 3.

II. Dispatcher

Figure 2:
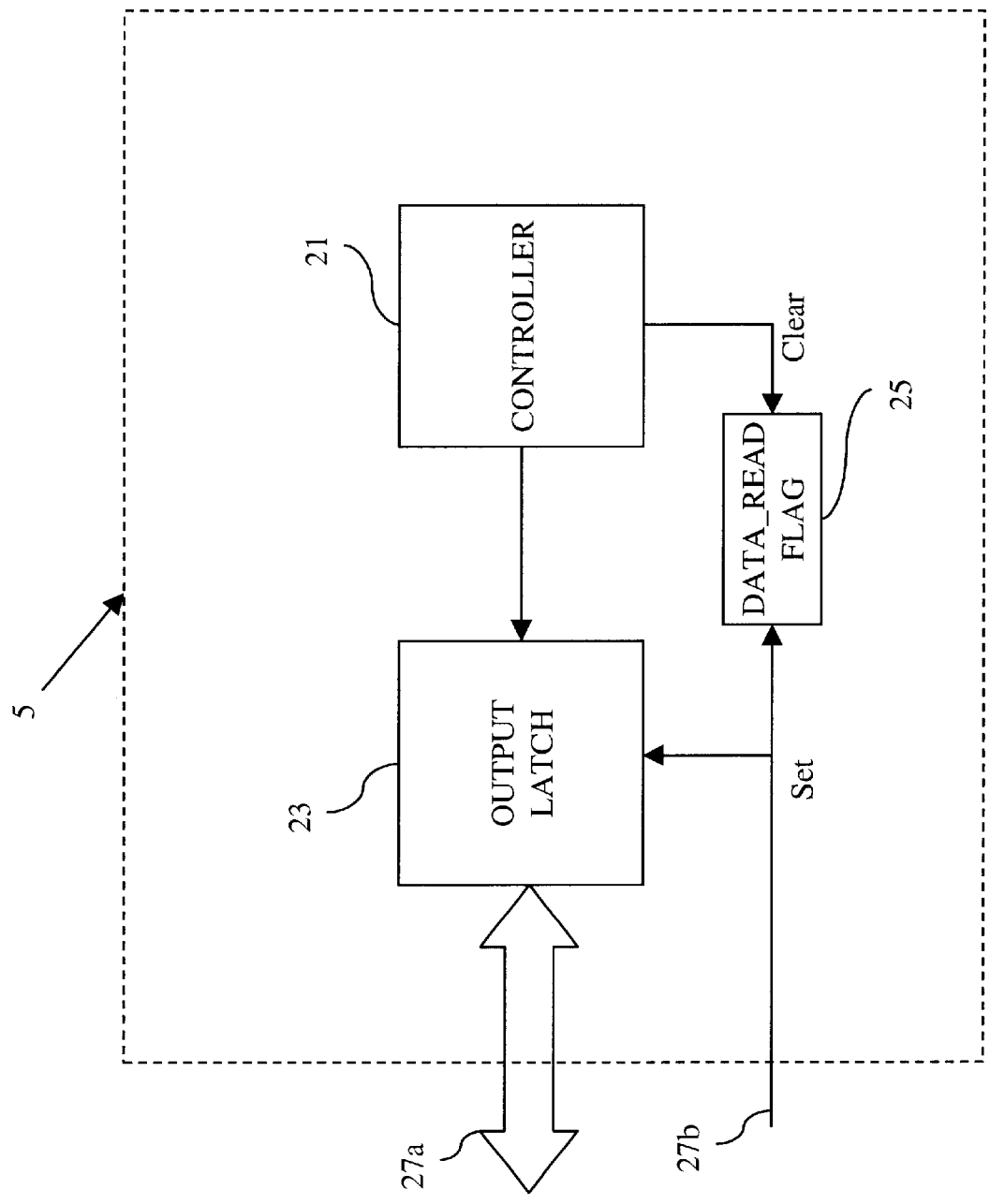
FIG. 2 illustrates a block diagram of one embodiment of the dispatcher of the fast download program system of the present invention.

FIG. 2 illustrates a block diagram of one embodiment of the dispatcher of the fast download program system of FIG. 1. The dispatcher includes a controller 21, a output latch 23 and a data_read flag 25. The controller 21 coordinates the transferring of program information, e.g., data from the host system to the dispatcher and from the dispatcher 5 to the target system 3. The controller 21 is coupled to the output latch 23 to control the loading and unloading of program information to the output latch 23. The output latch temporarily stores the program information which is eventually transferred to the target system through data stream 27a.

When the controller 21 fills the output latch, i.e., program information received by the host system is transferred to the output latch 23, the output latch clears the data_read flag 25. The data_read flag 25 coordinates the synchronization of the loading and unloading of the program information between the dispatcher and the target system. Once the output latch is empty, i.e., the program information is completely transferred to the target system 3 from the dispatcher 5, the data_read flag 25 is set by the target system through data_set signal 27b. Thus, with the data_read flag 25 being set, the dispatcher is notified that downloading of the program information is complete. Accordingly, if additional program information needs to be transferred to the target system, the dispatcher loads the program information to the output latch and again clears the data_read flag 25.

III. Target System

Figure 3:
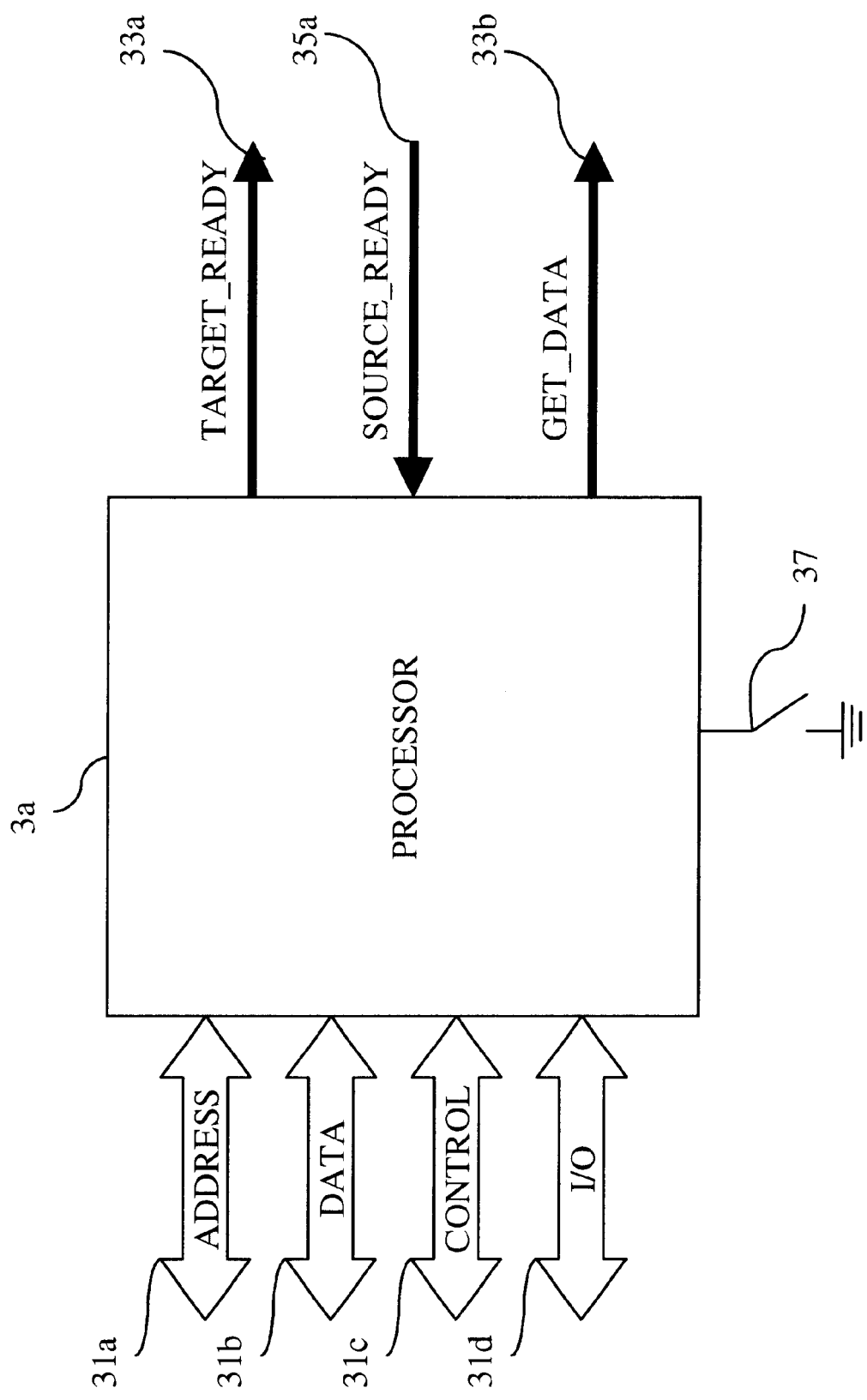
FIG. 3 illustrates a block diagram of one embodiment of a processor in the target system of the fast download program of the present invention.

FIG. 3 illustrates a block diagram of one embodiment of a processor in the target system of the fast download program of FIG. 1. The processor 3a is coupled to at least four bi-directional communication channels, an address channel 31*a*, a data channel 31*b*, a control channel 31*c*, and an input/output channel 31*d*. The address channel 31*a* is utilized to transfer address information regarding instructions and data used by the processor and provided by the processor 3*a* to the other components 3*b* (FIG. 1). For example, address information is provided to fetch or retrieve instructions or a sequence of instructions from the read only memory. The data channel 31*b* is a conduit or bus that transfers data to and from the processor to the other components. For example, data transferred into the target system is transmitted over the data channel 31*b* for storage of the program information in the read only memory. The input/output channel 31*d* provides a conduit for information to be received and sent to devices or systems beyond the target system and the dispatcher. The control channel 31*c* supplies specific control signals and commands to orchestrate the operation of the processor in conjunction with the data, address and input/output channels. The processor 3*a* performs actual instruction sequencing, fetching instructions from memory, decoding and executing the instructions.

In one embodiment, the data channel 31*b* is also used to transfer program information into the target system. In this embodiment, the lower 8 bits of the data channel are used for transferring program information into the target system. In another embodiment, the lower 16 bits of the data channel are used. The data channel 31*b*, in one embodiment, is coupled to the data stream 27*a* (FIG. 2). In one embodiment, the processor 3*a* is also configured to supply two output handshake signals, target_ready 33*a* and get_data 33*b*, and accept one input handshake signal, source_ready 35*a*. The handshake signal target_ready 33*a* notifies the dispatcher that the target system is ready to receive information. The handshake signal get_data 33*b* notifies the dispatcher to download information. The get_data 33*b*, in one embodiment, is coupled to the data_set signal 27*b* (FIG. 2). The handshake signal source_ready 35*a* signifies that the dispatcher is ready to transfer information to the target system.

In one embodiment, the processor 3*a* includes an additional pin, a download control pin 37. The download control pin allows the state of the processor to toggle or change to different modes of operation, i.e., from test mode to normal mode and vice versa. In test mode, the processor accepts and transfers information, e.g., program information, to and from the dispatcher 5 (FIG. 1). In normal mode, the processor operates as if the dispatcher was not attached or present and as instructed. In one embodiment, the download control pin is a preexisting pin on the processor that is able to enable the processor to accept and transfer information to and from the dispatcher and to disable the processor to ignore the handshake signals, target_ready 33*a*, get_data 33*b*, and source_ready 35*a*. Also, the de-activating of the download control pin, i.e., placing the processor in normal mode, enables the processor to execute the program information downloaded from the dispatcher.

In one embodiment, additional pins are added to the processor to be used as receivers or providers of the handshake signals, target_ready 33*a*, get_data 33*b*, and source_ready 35*a*. In another embodiment, pre-existing pins on the processor are used as receivers or providers of the handshake signals, target_ready 33*a*, get_data 33*b*, and source_ready 35*a*. In test mode, the pre-existing pins on the processor act or function as receivers or providers of the handshake signals. In normal mode, the pre-existing pins function in a predetermined fashion as prescribed by the configuration or design of the processor.

In one embodiment, the processor 3*a* includes three pre-existing bus-master pins, a bus grant pin, bus lock pin, and a bus request pin. A signal is supplied on the bus grant pin to notify other devices or systems sharing the same bus or similar communication medium as the processor that the first processor is not utilizing the bus. For instance, when a signal on the bus grant pin is asserted other devices are free to utilize the bus. Thus, the bus grant pin is utilized as a provider of the handshake signal target_ready 33*a* to notify the dispatcher that the target system is ready to receive information.

A signal is supplied on the bus lock pin to prevent other devices or systems sharing the same bus as the processor 3*a* from using the bus. For instance, when a signal on the bus lock pin is asserted the processor 3*a* has total use of the bus. Thus, the signal supplied on bus lock pin is utilized as the handshake signal get_data 33*b* to notify the dispatcher to download information to the target system. A signal supplied on the bus request pin notifies the processor that another particular device or system wants to utilize the bus. For example, when a signal on the bus request pin is asserted the processor 3*a* is notified that another device wants to utilize the bus. Thus, the signal supplied on the bus request pin is utilized as the handshake signal source_ready 35*a* to notify the processor that the dispatcher is ready to transfer information to the target system.

Figure 4A:
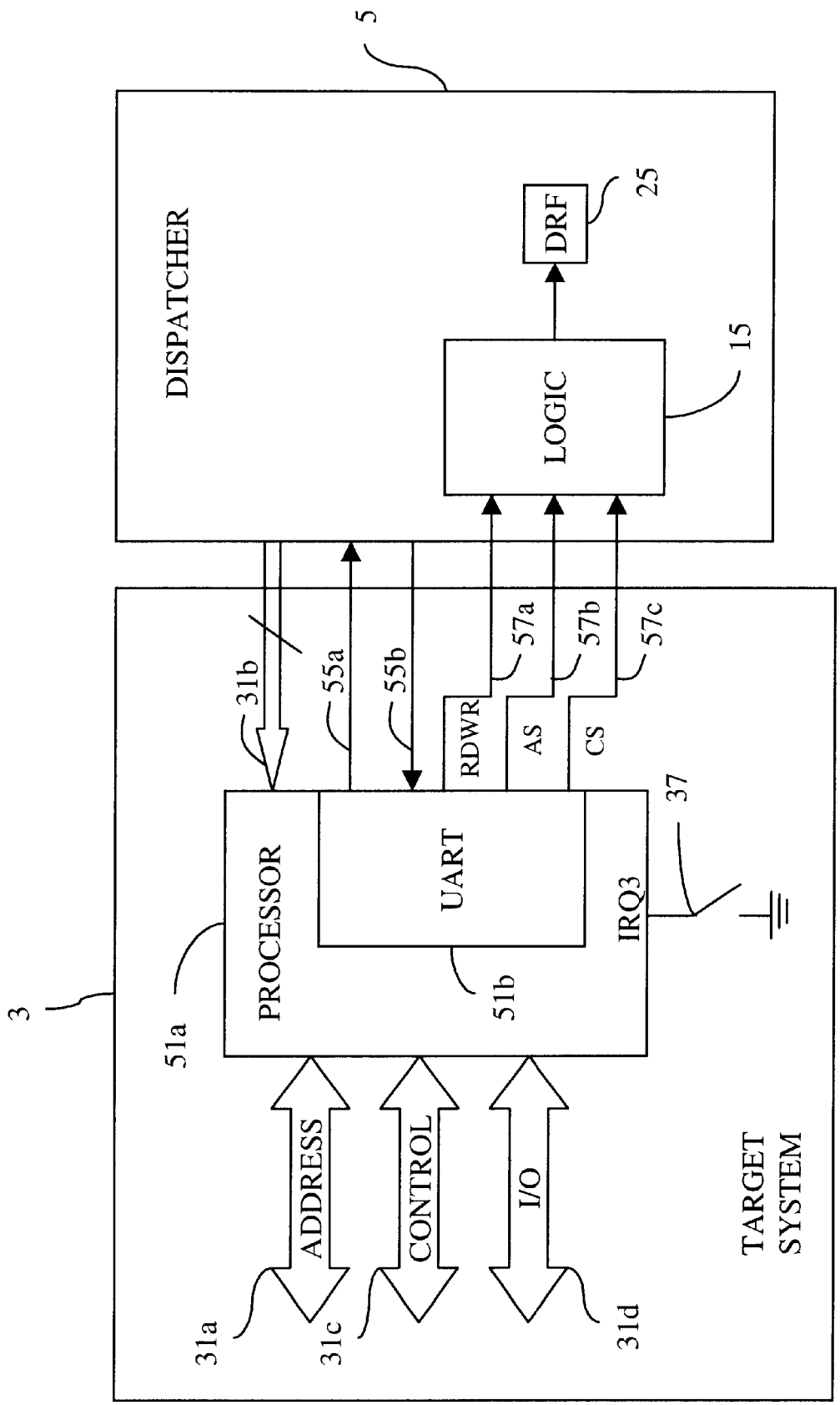
FIG. 4A illustrates a block diagram of one embodiment of a processor in the target system of the present invention using existing pins to emulate handshake signals.
Figure 4B:
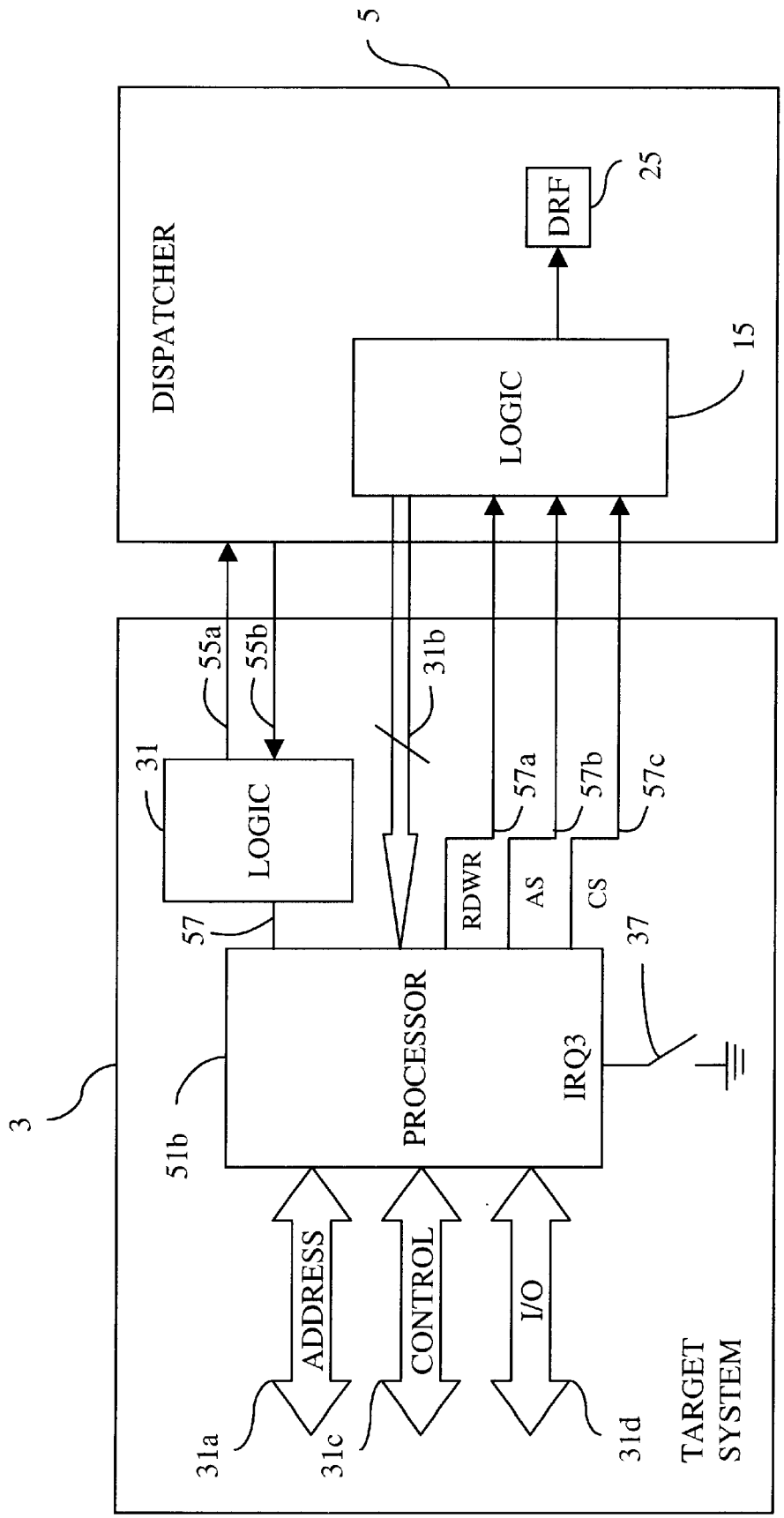
FIG. 4B illustrates a block diagram of another embodiment of a processor in the target system of the present invention using existing pins to emulate handshake signals.

FIGS. 4A–4B further illustrate embodiments of processors in the target system of the present invention using existing pins to emulate handshake signals. In FIG. 4A, a first processor 51*a* using a on-board universal asynchronous receiver-transmitter (UART) 51*b* that includes pre-existing signals to provide the functionality of the handshake signals target_ready 33*a*, source_ready 35*a*, and get_data 33*b* (FIG. 3). The UART 51*b* includes a data terminal ready (DTR) signal 55*a* that performs the function of notifying another device or system that the first processor is ready to receive information. Thus, the DTR signal 55*a* is capable of being utilized as the handshake signal target_ready 33*a* to notify the dispatcher that the target system is ready to receive information.

A data set ready (DSR) signal 55*b* that functions to signify that data is to be transferred to the first processor 51*a*. Thus, when the DSR signal 55*b* is asserted, the second processor is notified that a source, the dispatcher, is ready to transfer data to the target system. Hence, the DSR signal is capable of being utilized as the handshake signal source_ready 35*a* to notify the target system that the dispatcher is ready to transfer information to the target system. Three additional pre-existing signals, read/write signal (RDWR) 57*a*, address strobe signal (AS) 57*b* and chip select signal (CS) 57*c*, are combined through logic coupler 15 to emulate the handshake signal get_data 33*b* in which the dispatcher is notified to download information to the target system. The logic coupler 15 also produces a signal to set the data_read flag 25 to notify the dispatcher that the download of the program information is complete. In one embodiment, the logic coupler 15 is a multiplexer.

In FIG. 4B, a second processor 51*b* using a on-board companion logic chip 31 that includes pre-existing signals to provide the functionality of the handshake signals target_ready 33*a* and source_ready 35*a*. The on-board companion logic chip 31 produces a DTR signal 55*a* and receives a DSR signal 55*b*, as previously described above in reference to FIG. 4A. The DTR signal and the DSR signal are established from a single data signal 57 coupled to the second processor 51*b*. Similar to the first processor 51*a* (FIG. 4A), utilizing three additional pre-existing signals RDWR signal 57*a*, AS signal 57b and CS signal 57c combined through logic coupler 15 emulates the handshake signal get_data 33b in which the dispatcher is notified to download information to the target system. The logic coupler 15 also produces a signal to set the data_read flag 25 to notify the dispatcher that the download of the program information is complete. In one embodiment, the logic coupler 15 is a multiplexer. As one skilled in the art would recognize other processors could be used that provide pre-existing pins such as those described in reference to the before-mentioned processors.

Referring to both FIGS. 4A–4B, address channel 31a, data bus 31b, control channel 31c and input/output channel 31d, operate in a similar fashion as the corresponding channels described in reference to FIG. 3. Also, a third interrupt queue pin is utilized to operate as the download control pin 37. Thus, when a third interrupt is generated, the third interrupt queue pin is asserted and thus the first and second processors 51a,b are placed in test mode. Likewise, when the third interrupt is generated again, the third interrupt queue pin is toggled, i.e., disasserted, and thus the first and second processors 5a,b are returned to normal mode. Alternatively, when the third interrupt is serviced, the third interrupt queue pin is disasserted and thus the first and second processors 51a,b are placed in normal mode.

III. Download Process

Figure 5:
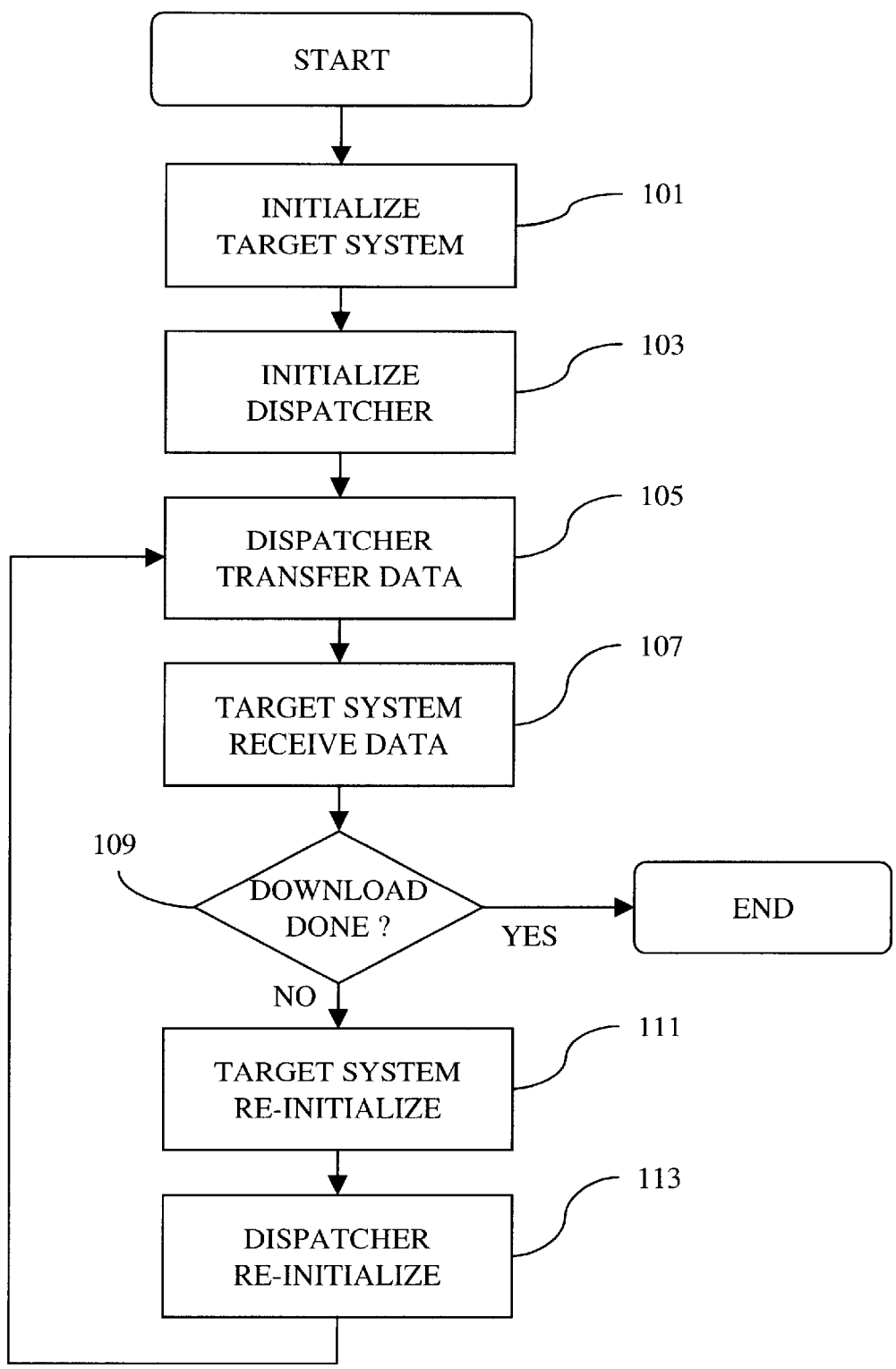
FIG. 5 illustrates a flow diagram of one embodiment of a download process utilizing the fast download program system of the present invention.

FIG. 5 illustrates an overview of one embodiment of a download process utilizing the fast download program system of FIG. 1. In step 101, the process initializes the target system 3. During step 101, the target system is switched to test mode. Also, the target system notifies the dispatcher 5 that the target system is ready to receive information. The target system then waits for the dispatcher to notify the target system that the dispatcher is ready to download information to the target system. In step 103, the process initializes the dispatcher. The dispatcher receives information, e.g., program information or data, from the host system. The dispatcher prepares the information to be transferred to the target system. The dispatcher then confirms and, if needed, waits for the target system to notify the dispatcher that the target system is ready to receive information. In step 105, once the dispatcher and the target system are initialized, the process initiates the dispatcher to transfer information to the target system. In step 107, the process initiates the target system to receive and copy the information being transferred from the dispatcher. In step 109, the process determines if the transfer of the program information is complete, i.e., if additional information needs to be supplied to the target system. If the transfer of the information is complete, then the target system switches out of test mode and into normal mode and then the process ends. However, if the transfer of the information is not complete, then the process re-initializes the target system in step 111. In step 113, the process re-initializes the dispatcher and causes the dispatcher to download additional information from the host system. The process then repeats by continuing to step 105 to initiate the dispatcher to transfer the program information to the target system.

Figure 6A:
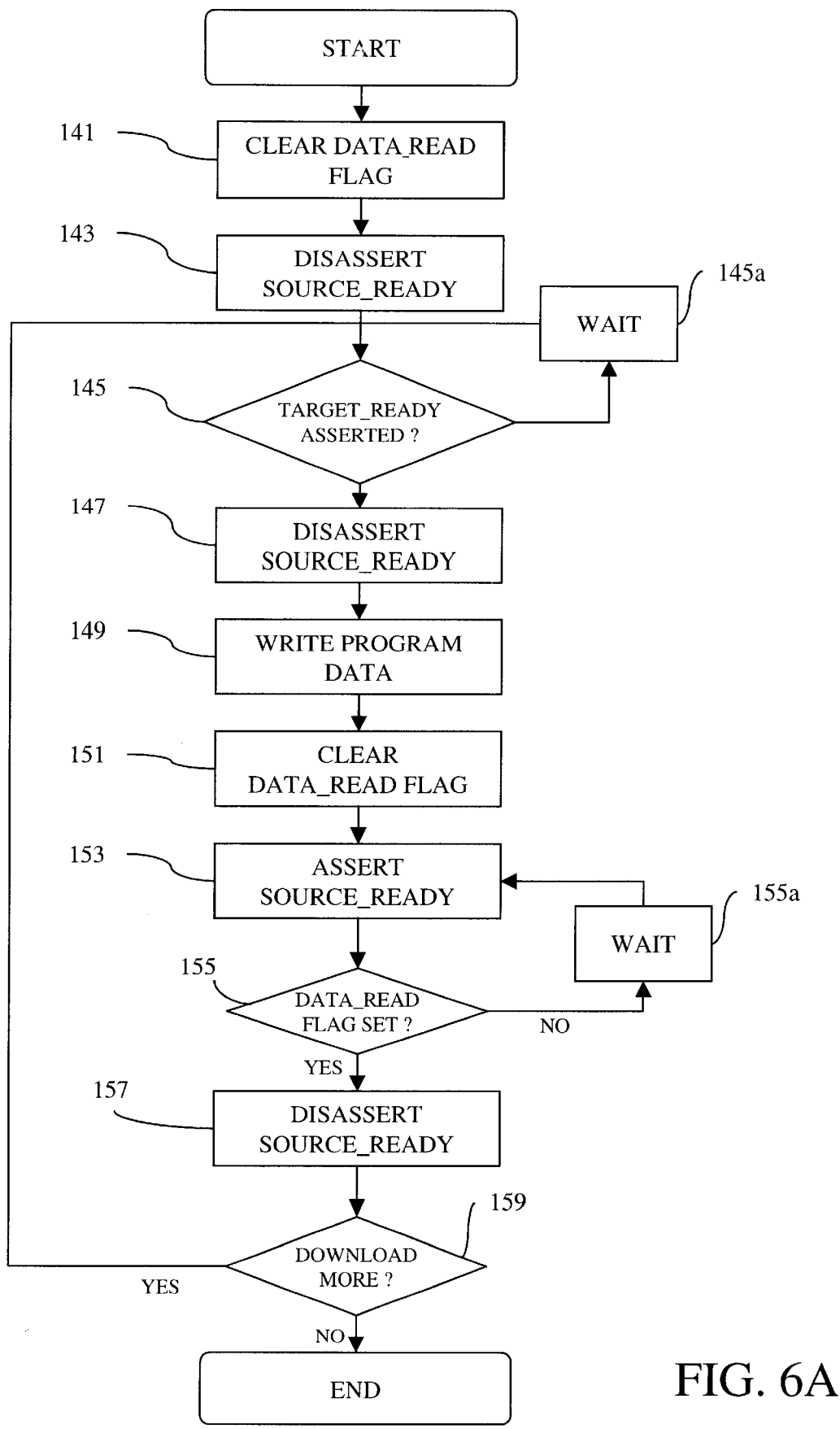
FIG. 6A illustrates a flow diagram of one embodiment detailing the download process of FIG. 5 operated by the dispatcher of the fast download program system of the present invention.

FIG. 6A illustrates a detailed flow diagram of one embodiment of steps 103, 105, 109 and 113 of the process of FIG. 5 operated by the dispatcher of the fast download program system of FIGS. 1–3. The dispatcher clears the data_read flag 25 (step 141). The dispatcher also clears or disasserts the handshake signal source_ready 35a (step 143). The dispatcher then waits for a response from the target system 3 by determining if the handshake signal target_ready 33a is asserted (step 145). If the dispatcher determines that the handshake signal target_ready 35a is not asserted, then the target system waits a predetermined amount of time (step 145a) before checking if the handshake signal target_ready 35a has been asserted (step 145). If the target system determines that the handshake signal source_ready 35a has been asserted (step 145), then the target system disasserts or de-activates the handshake signal source_ready 35a (step 147).

By disasserting the handshake signal source_ready, the dispatcher proceeds to load the program information. The dispatcher starts the transfer of the program information to the output latch (step 149). Once the program information has been loaded by the dispatcher, the dispatcher then clears the data_read flag 25 (step 151). The dispatcher then asserts the handshake signal source_ready 35a (step 153). This notifies the target system that the dispatcher is ready to transfer program information to the target system. The dispatcher then determines if the data_read flag 25 is set (step 155). If the dispatcher determines that the data_read flag is not set, then the dispatcher waits for the data_read flag to be set (step 155a). If the dispatcher determines that the data_read flag is set, then the dispatcher disasserts the handshake signal source_ready 35a (step 157). The dispatcher, then determines if additional program information needs to be downloaded to the target system (step 159). If additional program information needs to be downloaded, the dispatcher repeats the process by determining if the handshake signal target_ready 33a is asserted (step 145). However, if additional program information does not need to be downloaded, then the dispatcher exits the download process.

Figure 6B:
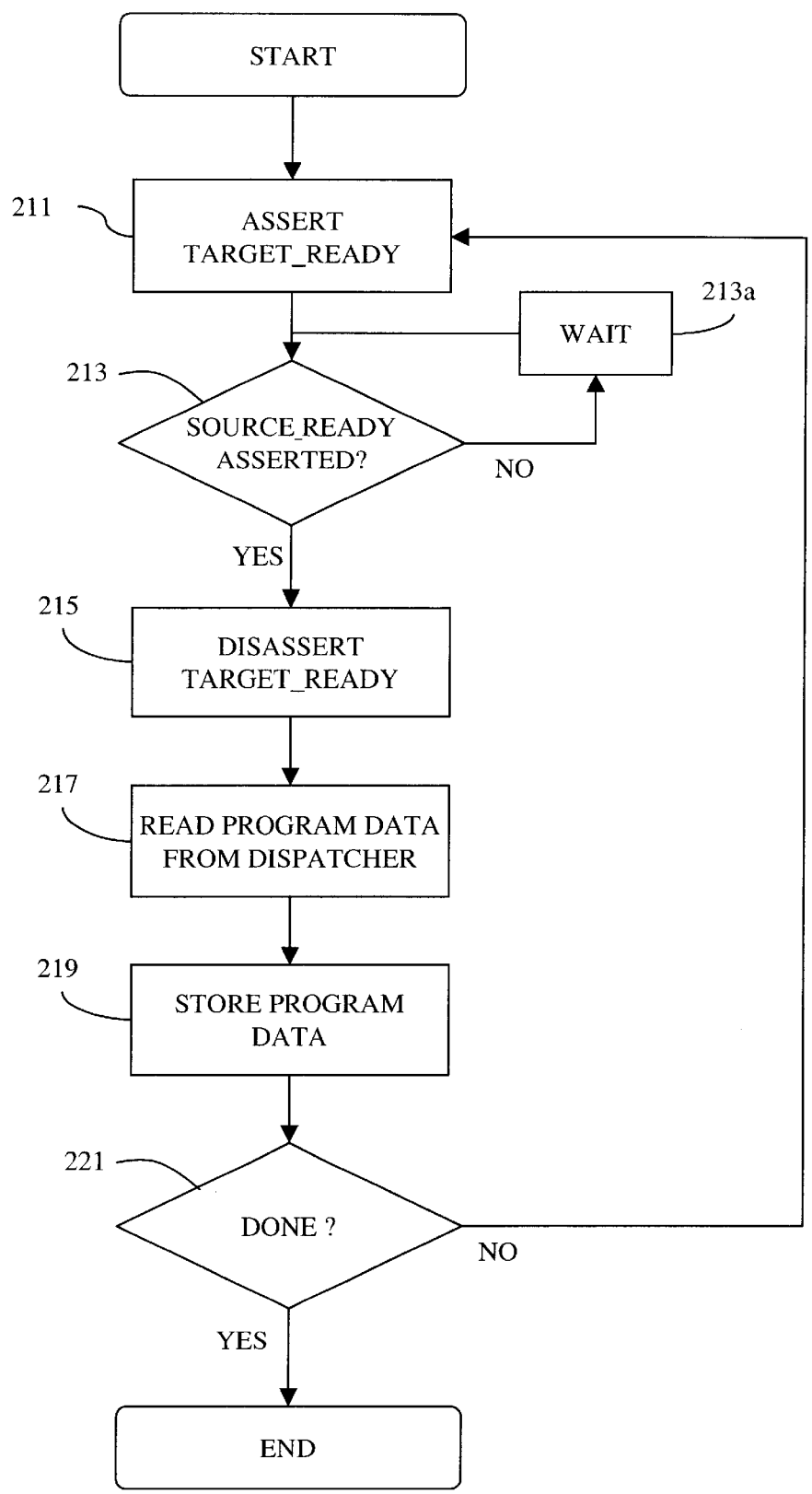
FIG. 6B illustrates a flow diagram of one embodiment detailing the download process of FIG. 5 operated by the target system of the fast download program system of the present invention.

FIG. 6B illustrates a detailed flow diagram of one embodiment of steps 101, 107, 109 and 111 of the process of FIG. 3 operated by the target system of the fast download program system of FIGS. 1 and 2. The target system asserts or activates the handshake signal target_ready 33a (step 211). The target system then waits for a response from the dispatcher 5 by determining if the handshake signal source_ready 35a is asserted (step 213). If the target system determines that the handshake signal source_ready 35a is not asserted, then the target system waits a predetermined amount of time (step 213a) before checking if the handshake signal source_ready 35a has been asserted (step 213). If the target system determines that the handshake signal source_ready 35a has been asserted (step 213), then the target system disasserts or de-activates the handshake signal target_ready 33a (step 215). By disasserting the handshake signal target_ready, the dispatcher, if ready, proceeds to transfer the program information. The target system receives the program information being transferred by the dispatcher (step 217). Once the program information has been completely received by the target system, the target system stores the program information in memory, e.g., the read-only memory (step 219).

The target system examines the program information to determine if additional portions of the program information needs to be downloaded (step 221). If the target system determines that additional portions of the program information does need to be downloaded, then the target system repeats by asserting the handshake signal target_ready 33a (step 211). However, if the target system determines that additional program information does not need to be downloaded, then the target system exits the download process.

Accordingly, the present invention provides a fast download program system. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method of downloading program information to a target system using a fast program download system, the target system having a processor on a printed circuit board, the method comprising:

providing program information to a dispatcher;

notifying the target system that the program information is ready to be transferred;

notifying the dispatcher to transfer the program information into the target system;

transferring the program information to the target system from the dispatcher via a direct connection, the direct connection includes contact pads embedded in the printed circuit board of the target system.

2. The method of claim 1 wherein the notifying the target system that the program information is ready to be transferred is performed by activating a first handshake signal from the processor.

3. The method of claim 2 wherein the notifying the dispatcher to transfer the program information is performed by activating a second handshake signal from the processor.

4. The method of claim 1 wherein the program information is a test program designed to validate components on the target system and interconnections between components on the target system.

5. The method of claim 1 wherein the direct connection further includes a header connector contacting the contact pads embedded in the printed circuit board and a ribbon cable connecting the header connector to the dispatcher.

6. The method of claim 1 further comprising switching the target system to a test mode operation, the test mode operation permitting the target system to download program information from the dispatcher.

7. The method of claim 6 further comprising switching the target system to a normal mode operation, the normal mode operation permitting the target system to execute the program information transferred from the dispatcher.

8. The method of claim 1 further comprising:

modifying the program information by utilizing a host system;

transferring the modified program information from the host system to the dispatcher; and transferring the modified program information from the dispatcher to the target system.

9. The method of claim 1 further comprising:

identifying when additional program information is to be transferred from the dispatcher to the target system;

re-initializing the dispatcher and the target system upon the additional program information being identified; and transferring the additional program information from the dispatcher to the target system.

10. A fast download program system to download program information, the fast download program system comprising:

target system having:
  a printed circuit board;
  a processor on the printed circuit board;
  a target interface having electrical contact pads embedded on the printed circuit board and the processor having information signals coupled to the electrical contact pads;

dispatcher having a dispatcher interface coupled to the target system via the target interface, such that dispatcher interface is coupled to the information signals of the processor.

11. The fast download program system of claim 10 wherein the information signals include a data bus to transfer program information between the dispatcher and the target system.

12. The fast download program system of claim 11 wherein the target interface further includes a header connector contacting the contact pads embedded in the printed circuit board and a ribbon cable connecting the header connector to the dispatcher.

13. The fast download program system of claim 10 wherein the dispatcher interface is a bed-of-nails connector.

14. The fast download program system of claim 10 wherein the dispatcher includes an output latch to temporarily store program information to be transferred to the target system.

15. The fast download program system of claim 14 wherein the information signals include handshake signals to coordinate the transfer of the program information between the dispatcher and the target system.

16. The fast download program system of claim 15 wherein the handshake signals comprise:

a first handshake signal to notify the dispatcher that the target system is ready to receive program information;

a second handshake signal to notify target system that the dispatcher is ready to transfer program information; and a third handshake signal to notify the dispatcher to download the program information to the target system.

17. The fast download program system of claim 16 further comprising a download control pin coupled to the processor to toggle the processor of the target system to a test mode operation, the test mode operation permitting the target system to download program information from the dispatcher.

18. The fast download program system of claim 17 wherein the download control pin is further configured to toggle the processor of the target system to a normal mode operation, the normal mode operation permitting the processor to execute the program information transferred from the dispatcher.

19. The fast program download system of claim 18 wherein the dispatcher further comprises a logic coupler configured to use existing control lines of the target system to generate a first data control signal to signify that program information in the output latch has been transferred.

20. The fast download program system of claim 19 wherein the logic coupler is a multiplexer.

21. The fast download program system of claim 20 wherein the first and second handshake signals are pre-existing control signals of the processor of the target system.

22. The fast download program system of claim 21 wherein the third handshake signal is a combination of pre-existing control signals of the processor of the target system.

23. The fast download program system of claim 22 wherein the program information is a test program designed to validate components on the target system and interconnections between components on the target system.

24. The fast download program system of claim 23 further comprising a host system coupled to the dispatcher and configured to create and transfer program information to the dispatcher.

25. The fast download program system of claim 24 wherein the target system includes a plurality of peripheral devices.

26. The fast program download system of claim 20 wherein the target system further comprises a logic component configured to use pre-existing control signals of the processor to provide the first and second handshake signals.

27. The fast download program system of claim 20 wherein the processor further comprises an universal asynchronous serial receiver-transmitter configured to provide the first, second and third handshake signals.

28. A method of downloading program information to a target system using a fast program download system, the target system having a processor on a printed circuit board, the method comprising:

receiving a first handshake signal by the processor of the target system to signify that program information is ready to be transferred;

transmitting a second handshake signal from the processor of the target system upon receipt of receiving the first handshake signal;

transferring the program information to the target system via a direct connection, the direct connection includes contact pads embedded in the printed circuit board of the target system and coupled to the processor; and transmitting a third handshake signal from the processor of the target system to initiate the transferring of the program information.

29. The method of claim 28 wherein the program information is a test program designed to validate components on the target system and interconnections between components on the target system.

30. The method of claim 28 wherein the direct connection further includes a header connector contacting the contact pads embedded in the printed circuit board and a ribbon cable connecting the header connector to the dispatcher.

31. The method of claim 30 further comprising switching the target system to a test mode operation, such that in the test mode operation, the processor of the target system recognizes the first, second and third handshake signals.

32. The method of claim 31 further comprising switching the target system to a normal mode operation, such that in the normal mode operation, the processor of the target system executes the program information transferred and ignores the first, second and third handshake signals.

33. A fast download program system to download program information, the fast download program system comprising:

target system having:
  a printed circuit board;
  a processor on the printed circuit board having additional pins;
  a target interface having electrical contact pads embedded on the printed circuit board and the processor having additional pins to receive and supply information signals coupled to the electrical contact pads; and dispatcher having a dispatcher interface coupled to the target system via the target interface, such that dispatcher interface is coupled to the information signals of the processor;

wherein the information signals are handshake signals to coordinate downloading of the program information.

34. The fast download program system of claim 33 wherein the information signals further comprise a data bus to transfer program information between the dispatcher and the target system.

35. The fast download program system of claim 34 wherein the handshake signals comprise:

a first handshake signal to notify the dispatcher that the target system is ready to receive program information;

a second handshake signal to notify target system that the dispatcher is ready to transfer program information; and a third handshake signal to notify the dispatcher to download the program information to the target system.

36. The fast download program system of claim 35 further comprising a download control pin coupled to the processor to toggle the processor of the target system to a test mode operation, such that the processor of the target system recognizes the first, second and third handshake signals.

* * * * *